(12) United States Patent  
Mizushina

(10) Patent No.: US 7,660,410 B2  
(45) Date of Patent: Feb. 9, 2010

(54) CELLULAR PHONE APPARATUS WITH KEYBOARD

(75) Inventor: Takahiro Mizushina, Kawagoe (JP)

(73) Assignee: Casio Computer Co., Ltd., Tokyo (JP)

( * ) Notice: Subject to any disclaimer, the term of this patent is extended or adjusted under 35 U.S.C. 154(b) by 466 days.

(21) Appl. No.: 11/605,111

(22) Filed: Nov. 28, 2006

(65) Prior Publication Data

US 2007/0123322 A1    May 31, 2007

(30) Foreign Application Priority Data

Nov. 30, 2005  (JP)  ............................. 2005-346526
Aug. 31, 2006  (JP)  ............................. 2006-236946

(51) Int. Cl.
*H04M 1/00* (2006.01)
*H04M 9/00* (2006.01)
(52) U.S. Cl. ............................. 379/433.07; 379/433.12; 455/575.4
(58) Field of Classification Search ............ 379/433.06, 379/433.07, 433.11, 433.13, 433.12; 455/575.1, 455/575.3, 575.4; 345/169
See application file for complete search history.

(56) References Cited

U.S. PATENT DOCUMENTS

2005/0104856 A1    5/2005   Jacobs et al.

OTHER PUBLICATIONS

Internet article 2004 Impress Corporation; 3 pages; Nokia 9300.
Chinese Office Action dated Jan. 16, 2009 (4 pages), and English translation thereof (7 pages) issued in counterpart Chinese Application No. 2006101635356.

*Primary Examiner*—Tuan D Nguyen
(74) *Attorney, Agent, or Firm*—Frishauf, Holtz, Goodman & Chick, P.C.

(57) ABSTRACT

A cellular phone has a three-stage stacked structure including a ten-key case of a lower stage, a full-key case of a middle stage and a display case of an upper stage. When the cellular phone is in call style, the ten-key case is slid in the longitudinal direction to expose a dial key. When the cellular phone is in keyboard style, the display case is turned on its rotating shaft above the full-key case to expose a full keyboard. The rotating shaft is located in the middle of the display case and close to a long side thereof.

7 Claims, 8 Drawing Sheets

14D
DATA INPUT TEN KEY (A1) (A2)

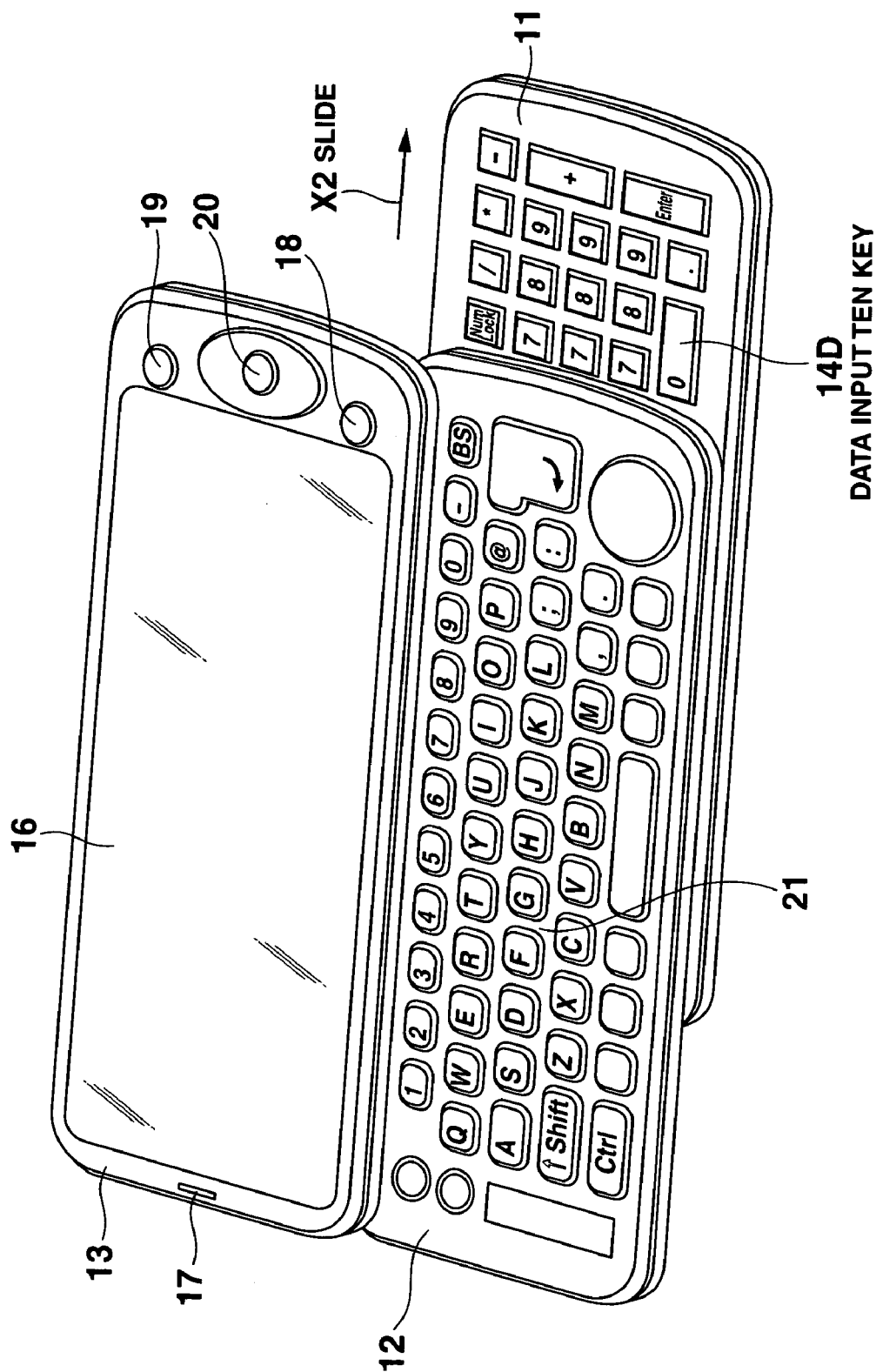

| ON | • | OFF |
|---|---|---|
| 1 | 2 | 3 |
| 4 | 5 | 6 |
| 7 | 8 | 9 |
| * | 0 | # |

14'T
CALL INPUT MODE

FIG.7B

| * | 7 | 8 | 9 | − |
|---|---|---|---|---|
| / | 4 | 5 | 6 | + |
| 0 | 1 | 2 | 3 | • |

14'D
DATA INPUT MODE

CELLULAR PHONE APPARATUS WITH KEYBOARD

CROSS-REFERENCE TO RELATED APPLICATIONS

This application is based upon and claims the benefit of priority from prior Japanese Patent Applications No. 2005-346526, filed Nov. 30, 2005; and No. 2006-236946, filed Aug. 31, 2006, the entire contents of both of which are incorporated herein by reference.

BACKGROUND OF THE INVENTION

1. Field of the Invention

The present invention relates to a cellular phone apparatus with a full keyboard, which can be used as a personal digital assistant (PDA) for e-mail and the Internet as well as a call.

2. Description of the Related Art

Recently, cellular phones have widely been used for access to e-mail and the Internet, preparation of documents, and the like. However, prior art cellular phones have only a ten key (dial key) in principle. In order to input characters other than numerals, generally, a user has to depress a key at least one time to select a desired character. Character input operations are therefore very troublesome and take a long time. To resolve this problem, a cellular phone with the same character input full keyboard as that of a personal computer and a cellular phone with both a ten key and a full keyboard are developed (refer to URL:http://k-tai.impress.co.jp/cda/article/news_toppage/20503.html, for example).

FIG. 8 is an external view of a cellular phone 1 with both a ten key and a full keyboard. In FIG. 8, (A1) is a front view of the cellular phone in use for a call, (A2) is a bottom view of the cellular phone in use for a call, (B1) is a front view of the cellular phone which is provided longitudinally and whose full keyboard is in use, and (B2) is a bottom view of the cellular phone which is provided longitudinally and whose full keyboard is in use.

The above cellular phone 1 includes a thin, rectangular terminal body 2 incorporating a main electronic circuit (not shown) and a cover section 3 that can be opened and closed through a hinge 4 provided on the long side of the terminal body 2. The terminal body 2 and cover section 3 serve as a cabinet of the cellular phone.

Referring to (A1) and (A2) in FIG. 8, the cover section 3, which corresponds to the front of the cellular phone 1 that is closed (in use for a call), includes a calling ten key 5 that can be operated with one hand in its lower area, an external display 6 in its upper area, a microphone 7 at its lower end and a speaker 8 at its upper end.

Referring to (B1) and (B2) in FIG. 8, the terminal body 2, which corresponds to the front of the cellular phone 1 that is opened (the full keyboard in use), includes a full keyboard 9 that can be operated with both hands, and the cover section 3 has a large-sized display 10 on its whole area.

The large-sized display 10 faces a user of the cellular phone 1 when the user opens the cover section 3 through the hinge 4 and, in other words, the display 10 is supported by the back of the cover section 3. If the cellular phone 1 is provided laterally to use the full keyboard, a user can depress keys to input characters with both hands. The laterally display 10 allows e-mail and a home page on the Internet to be displayed easily and clearly.

Since the above-described prior art cellular phone 1 includes the full keyboard 9 and large-sized display 10 which are located on the symmetrical areas in addition to the calling ten key 5 and its upper external display 6, it has the advantages of gaining access to e-mail and the Internet and preparing documents easily. However, the cellular phone 1 requires two display sections of the external display 6 and large-sized display 10, and thus its production costs are greatly increased.

The present invention has been developed in consideration of the above situation, and its object is to provide a cellular phone capable of maintaining good portability and operability without two display sections and thus reducing production costs.

BRIEF SUMMARY OF THE INVENTION

According to a first aspect of the present invention, there is provided a cellular phone having a three-stage stacked structure including a display case of an upper stage with a display screen, a keyboard case of a middle stage with a keyboard, and a dial key case of a lower stage with a dial key, wherein the display case is configured to turn on a shaft two-dimensionally to expose the keyboard of the keyboard case, the shaft being located in a middle of the keyboard case and close to a long side thereof, and the dial key case is configured to slide with reference to the keyboard case toward one end of the keyboard case to expose the dial key of the dial key case.

According to a second aspect of the present invention, there is provided a cellular phone having a three-stage stacked structure including a display case of an upper stage with a display screen, a keyboard case of a middle stage with a keyboard, and a key case of a lower stage with a dial key on one end portion of a surface thereof and a ten key on another end portion thereof, wherein the display case is configured to turn on a shaft two-dimensionally to expose the keyboard of the keyboard case, the shaft being located in a middle of the keyboard case and close to a long side thereof, and the key case is configured to slide with reference to the keyboard case toward both ends of the keyboard case, the key case sliding toward one of the ends to expose the dial key of the key case and sliding toward other of the ends to expose the ten key of the key case.

According to a third aspect of the present invention, there is provided a cellular phone having a three-stage stacked structure including a display case of an upper stage with a display screen, a keyboard case of a middle stage with a keyboard, and a key case of a lower stage with a shared key for a dial key and a ten key, wherein the display case is configured to turn on a shaft two-dimensionally to expose the keyboard of the keyboard case, the shaft being located in a middle of the keyboard case and close to a long side thereof, the key case is configured to slide with reference to the keyboard case toward one end of the keyboard case to expose the shared key of the key case, and the cellular phone includes switching means for switching the shared key between the dial key and the ten key in accordance with a state of the cellular phone when the key case slides.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is an external view of the appearance of a cellular phone according to a second embodiment of the present invention;

FIG. 7A is a pattern diagram of displaying key characters in call input mode in a call/data input shared ten key of the cellular phone according to the third embodiment of the present invention;

FIG. 7B is a pattern diagram of displaying key characters in call input mode in the call/data input shared ten key of the cellular phone according to the third embodiment of the present invention.

DETAILED DESCRIPTION OF THE INVENTION

Embodiments of the present invention will be described below with reference to the accompanying drawings.

First Embodiment

Figure 1A:
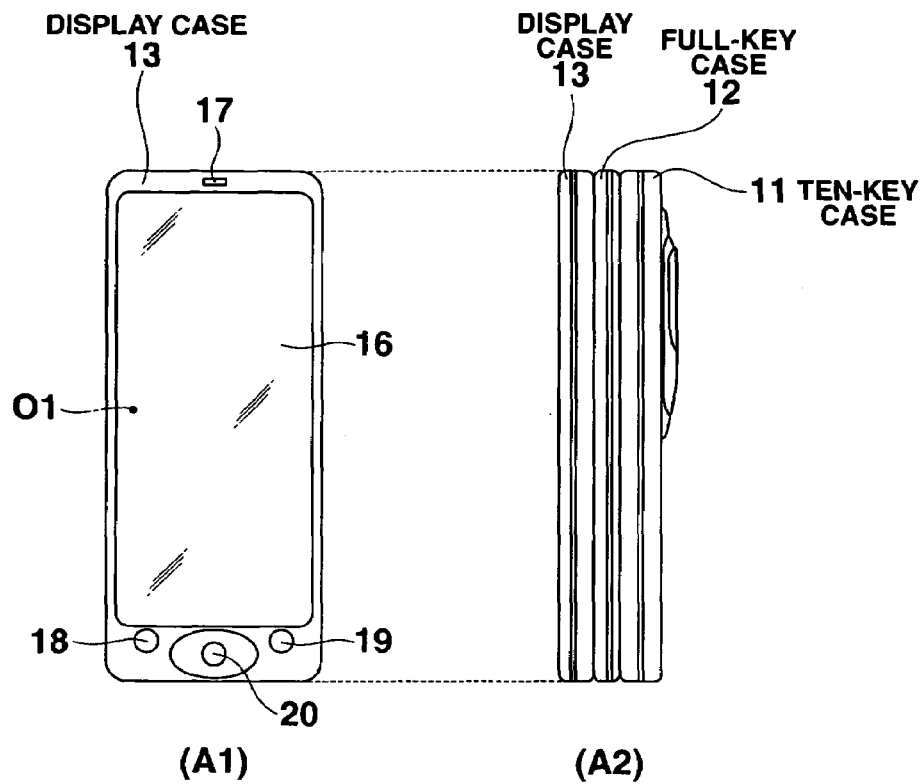
FIG. 1A is an external view of the appearance of a cellular phone according to a first embodiment of the present invention, which is in compact style.
Figure 1B:
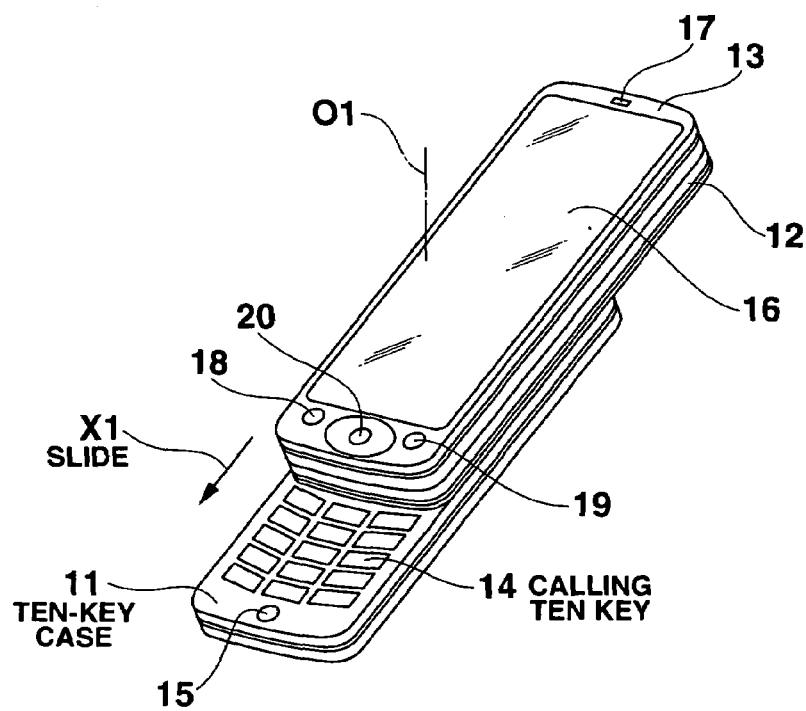
FIG. 1B is a perspective view of the appearance of the cellular phone according to the first embodiment of the present invention, which is in call style.

FIG. 1A is an external view of the appearance of a cellular phone according to a first embodiment of the present invention, which is in compact style. In FIG. 1A, (A1) shows a front view of the cellular phone in compact style and (A2) shows a side view thereof. FIG. 1B is a perspective view of the appearance of the cellular phone according to the first embodiment of the present invention, which is in call style.

The cellular phone has a three-stage stacked structure including a rectangular ten-key case 11 of the lower stage, a full-key case 12 of the middle stage, and a display case 13 of the upper stage. These cases have the same outside dimensions of, e.g., 130 mm×50 mm.

As indicated by arrow X1 in FIG. 1B, the ten-key case 11 of the lower stage is attached to the full-key case 12 and display case 13 of the middle and upper stages such that it can slide down by a predetermined distance. With this slide, the lower part of the front of the ten-key case 11 is exposed, and a calling ten key (dial key) 14 is provided in the exposed part. A microphone 15 is provided in the middle of the lower end portion of the calling ten key 14.

A liquid crystal display 16 is provided in the display case 13 of the upper stage. The screen size of the display 16 corresponds to almost the entire front of the case. A speaker 17 is provided in the middle of the upper end portion of the display case 13. First and second keys 18 and 19 that serve as calling on-hook and off-hook keys are provided on the right and left of the lower end portion of the display case 13. A cursor key 20 that serves as an item selection key, an enter key, etc. is provided in the middle of the lower end portion of the display case 13.

When the cellular phone is in compact style as shown in (A1) and (A2) of FIG. 1A, a user can display an image on the display 16 using the first and second keys 18 and 19 and cursor key 20. When a user receives an incoming call, he or she depresses any one of the keys 18 to 20 to perform a calling operation. The user can thus start a call through the microphone 15 on the ten-key case 11 and the speaker 17 on the display case 13.

As shown in FIG. 1B, in the call style in which the ten-key case 11 slides downward to expose the ten key 14 and microphone 15, a user can dial using the ten key 14 and call using the microphone 15 and speaker 17.

Figure 2A:
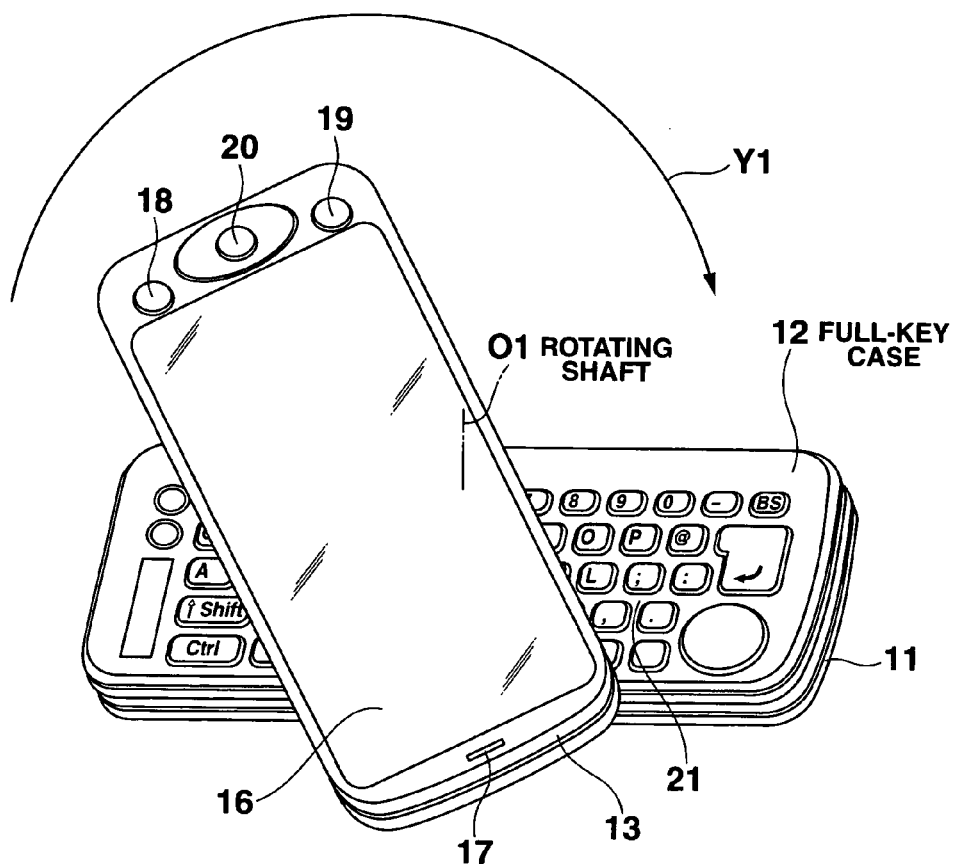
FIG. 2A is a perspective view illustrating a rotating operation of an upper display case on a full-key case of the middle stage, which is performed when the cellular phone according to the first embodiment of the present invention is changed into keyboard style.
Figure 2B:
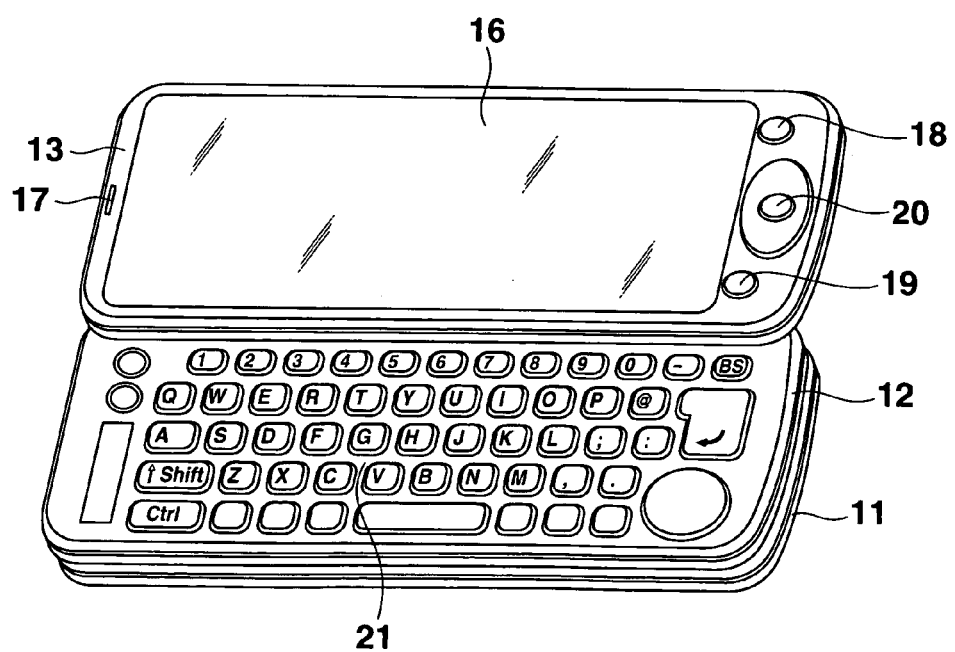
FIG. 2B is a perspective view of the appearance of the keyboard-style cellular phone according to the first embodiment of the present invention.

FIG. 2A is a perspective view illustrating a rotating operation of the display case 13 on the full-key case 12, which is carried out when the cellular phone according to the first embodiment of the present invention is changed into keyboard style;

FIG. 2B is a perspective view of the appearance of the keyboard-style cellular phone according to the first embodiment of the present invention.

When the cellular phone is in the compact style as shown in, for example, (A1) and (A2) of FIG. 1, the display case 13 can be turned 180° clockwise two-dimensionally as indicated by arrow Y1 in FIG. 2A. If the display case 13 is completely turned 180° as shown in FIG. 2B, the full keyboard 21 provided on the entire surface of the full-key case 12 is exposed, which is a keyboard style in which the user uses the cellular phone laterally. In the keyboard style, a user can easily create, send and receive e-mail and browse the Web page with both hands using the keys 18 to 20 of the display case 13, full keyboard 21 and liquid crystal display 16.

The first and second keys 18 and 19 and cursor key 20 that are provided on the display case 13 are located on the right-hand side of the whole case. A user can thus indicate a banner on the Web page and the like with very good operability.

The front region of the full-key case 12 in which the keys of the full keyboard 21 are arranged is depressed leaving only the outer edge thereof in accordance with the key stroke width of each of the keys. In this structure, the back of the display case 13 does not contact the keys of the full keyboard 21 in the compact style shown in FIG. 1A, (A1) and (A2) and in the call style shown in FIG. 1B.

Figure 3:
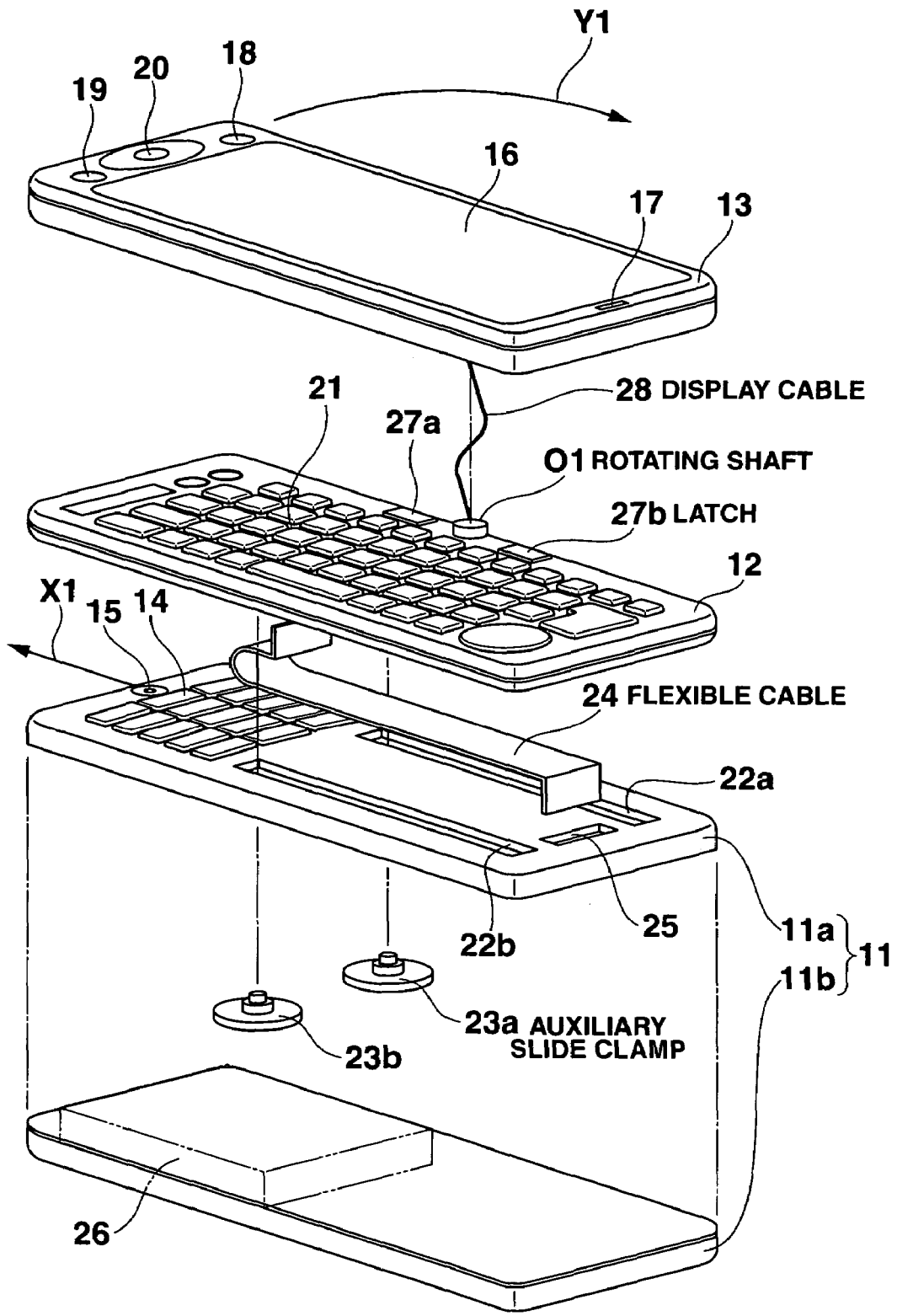
FIG. 3 is an exploded, perspective view showing a three-stage stacked structure of a ten-key case, a full-key case and a display case of the cellular phone according to the first embodiment of the present invention.

FIG. 3 is an exploded, perspective view showing a three-stage stacked structure of the ten-key case 11, full-key case 12 and display case 13 of the cellular phone according to the first embodiment of the present invention.

Rectangular slide slits 22a and 22b are formed in the upper cover 11a of the ten-key case 11 along both sides thereof. The slits 22a and 22b extend from the upper end of the upper cover 11a to the position of the calling ten key 14 and, in other words, they occupy about two-thirds of the upper cover 11a. The upper cover 11a is fitted onto the back of the full-key case 12 by inserting auxiliary slide clamps 23a and 23b into the slide slits 22a and 22b from the back of the upper cover 11a. Thus, the ten-key case 11 of the lower stage is attached to the full-key case 12 of the middle stage and display case 13 of the upper stage such that it can slide by a given distance in the downward direction indicated by arrow X1.

When a user depresses a key of the full keyboard 21 on the full-key case 12, a signal is transmitted toward the ten-key case 11 via a flexible cable 24 that is extended from the back of the full-key case 12. The cable 24 is connected to an internal electronic circuit 26 through a cable slit 25 that is formed at the upper end of the upper cover 11a of the ten-key case 11.

A hollow, cylindrical rotating shaft O1 is provided in the full-key case 12 to turn the display case 13 two-dimensionally in the direction indicated by arrow Y1. A display cable 28 is extended from the back of the display case 13 into the full-key case 12 through the hollow of the rotating shaft O1. Then, the cable 28 is connected to the electronic circuit 26 via the flexible cable 24.

Rotation latches 27a and 27b are provided on the surface of the full-key case 12 so as to sandwich the rotating shaft O1. The display case 13 is turned above the full-key case 12 two-dimensionally in the direction of arrow Y1 and semifixed in an appropriate position by bringing the rotation latches 27a and 27b into contact with the back of the display case 13.

The three-stage stacked structure of the ten-key case 11, full-key case 12 and display case 13 allows these cases to be moved and also allows a signal to be transferred to each other.

According to the above cellular phone of the first embodiment, when a user makes a call, he or she can slide the ten-key case 11 to expose the calling ten key 14 to the front. When the user creates e-mail, he or she can turn the display case 13 to expose the full keyboard 21 to the front. The cellular phone can thus be improved in operability in various scenes, such as a call, creation of email, and access to the Web. Moreover, the one liquid crystal display 16 can be shared between the call style and keyboard style with good operability. Consequently, the cellular phone of the first embodiment can be reduced in cost more greatly than prior art cellular phones that require two display sections.

Second Embodiment

FIG. 4 is an external view of the appearance of a cellular phone according to a second embodiment of the present invention.

In the cellular phone according to the second embodiment, a ten-key case 11 of the lower stage can be slid with reference to a full-key case 12 of the middle stage and a display case 13 of the upper stage by a give distance not only in the downward direction indicated by arrow X1 in FIG. 1B but also in its opposite upward direction indicated by arrow X2 in FIG. 4.

When the ten-key case 11 is slid by the given distance in the direction of arrow X2, the right-hand region of the top of the ten-key case 11 is exposed. A data input ten key 14D, which is used laterally, is provided on the exposed region, while a calling ten key 14 is provided on the left-hand region of the top of the case 11.

In call style, the cellular phone is used longitudinally and the calling ten key 14 is exposed by sliding the ten-key case 11 in the downward direction of the cellular phone. In keyboard style, the cellular phone is used laterally and the data input ten key 14D is exposed by sliding the ten-key case 11 in the right-side direction (which corresponds to the upward direction opposite to the above downward direction). As in a desktop personal computer, a ten-key input operation can be performed independently on the right side of the full keyboard 21. Consequently, as in the first embodiment, the cellular phone of the second embodiment can be improved in operability in keyboard style to create, transmit and receive e-mail, browse the Web page, etc., without spoiling portability.

Third Embodiment

Figure 5A:
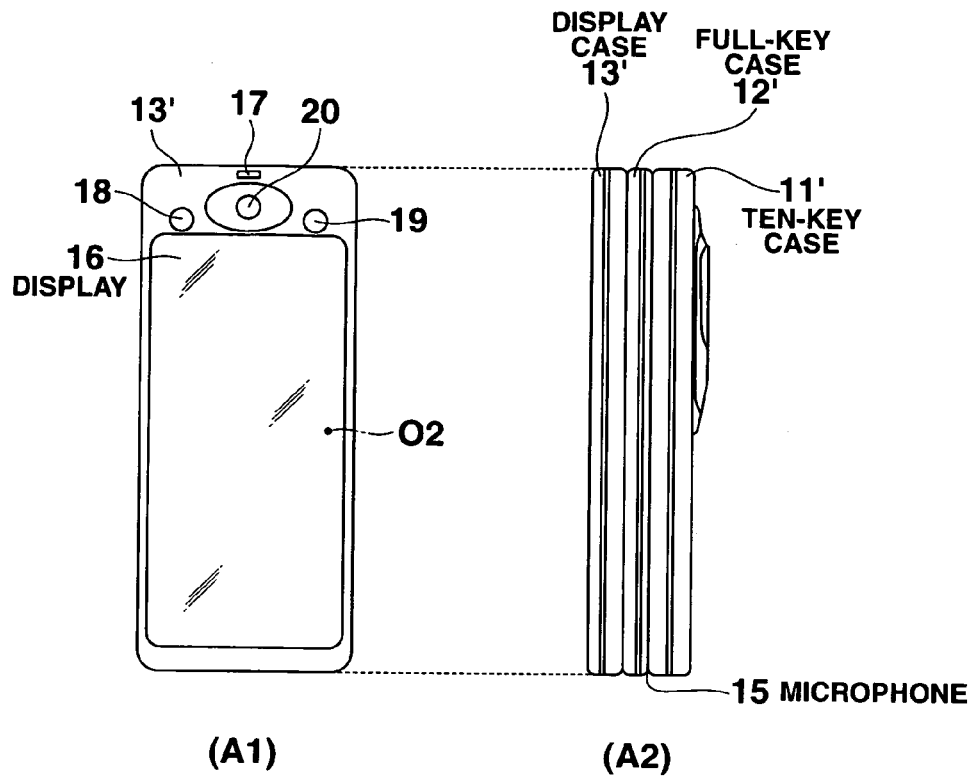
FIG. 5A is an external view of the appearance of a cellular phone according to a third embodiment of the present invention.
Figure 5B:
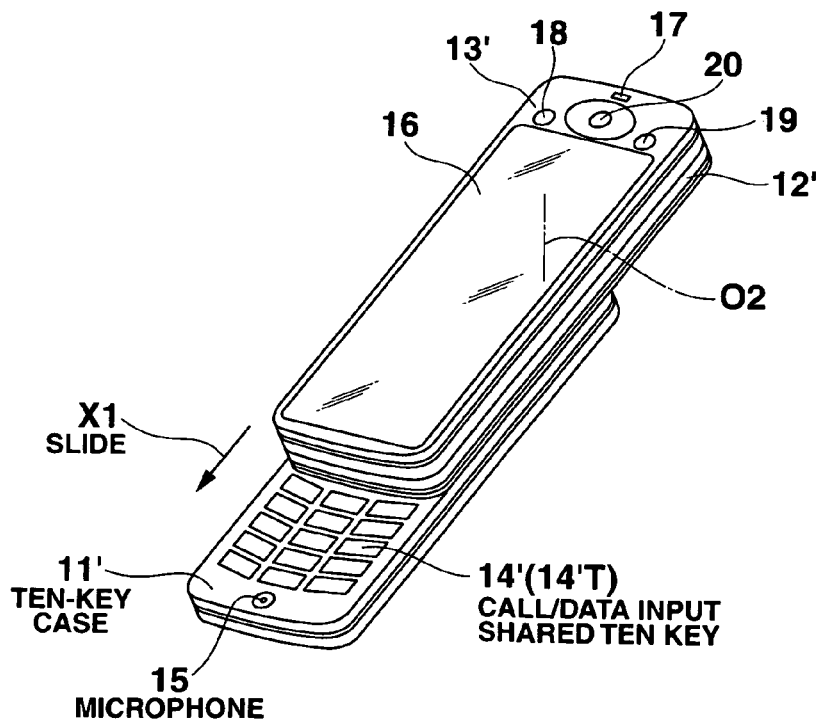
FIG. 5B is a perspective view of the appearance of the cellular phone according to the third embodiment of the present invention, which is in call style.

FIG. 5A is an external view of the appearance of a cellular phone according to a third embodiment of the present invention. In FIG. 5A, (A1) shows a front view of the cellular phone in compact style and (A2) shows a side view thereof. FIG. 5B is a perspective view of the appearance of the cellular phone according to the third embodiment of the present invention, which is in call style.

Figure 6A:
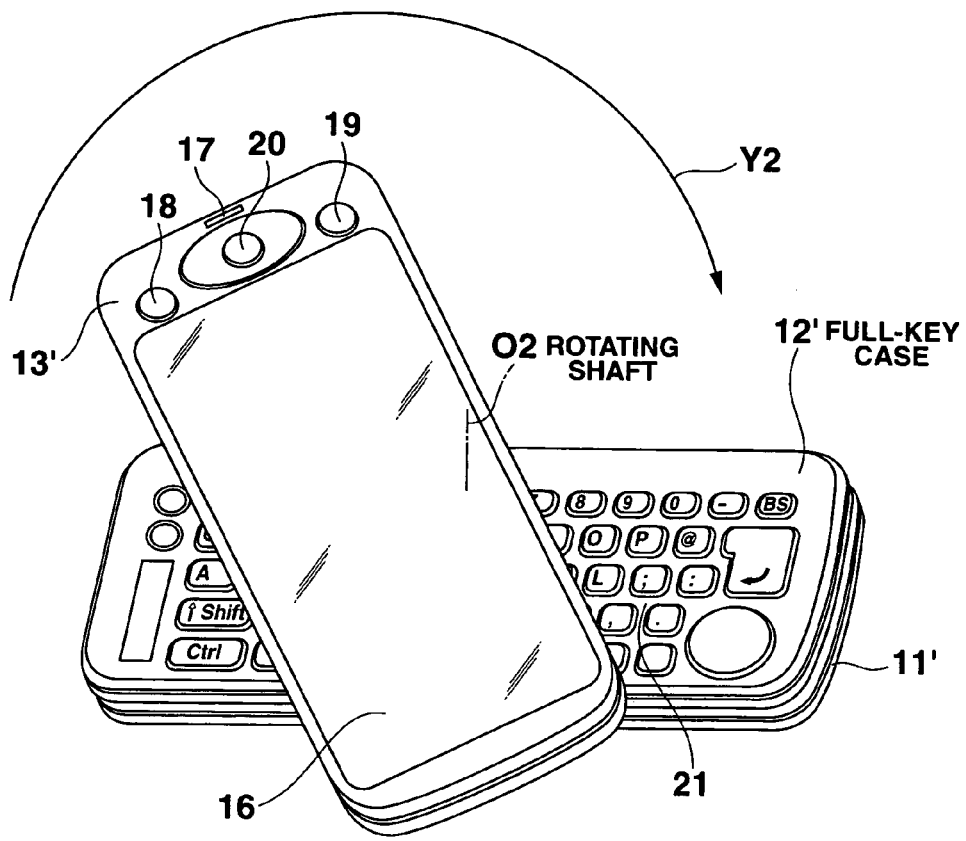
FIG. 6A is a perspective view illustrating a rotating operation of a display case of the upper stage on a full-key case of the middle stage, which is performed when the cellular phone according to the third embodiment of the present invention is changed into keyboard style.
Figure 6B:
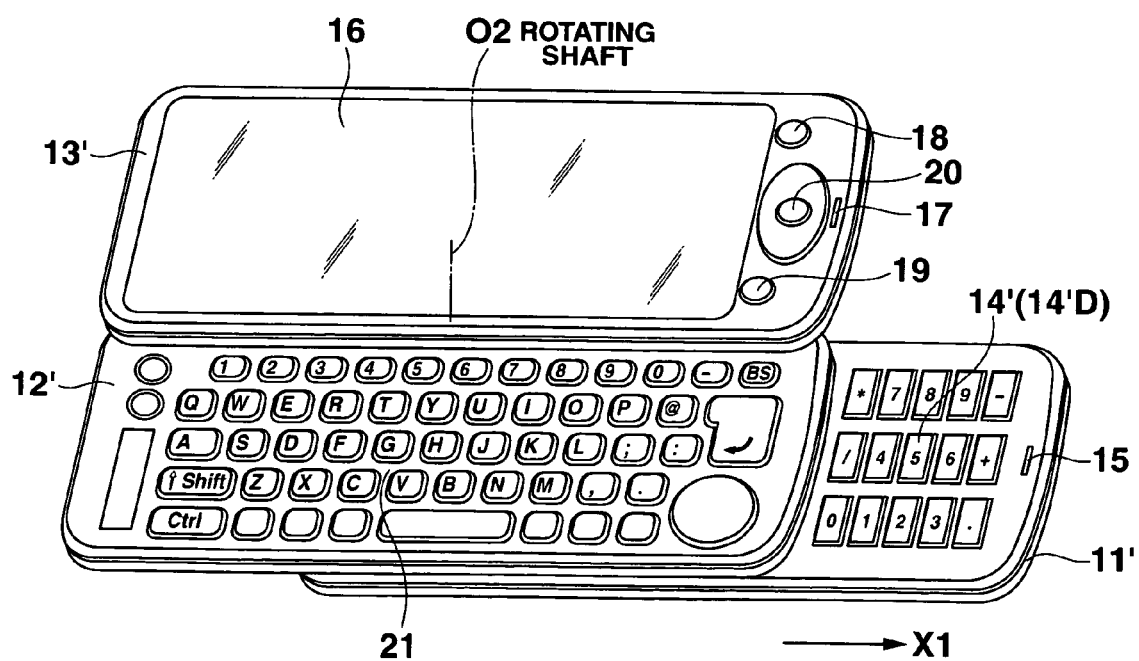
FIG. 6B is a perspective view of the appearance of the keyboard-style cellular phone according to the third embodiment of the present invention.
Figure 8:
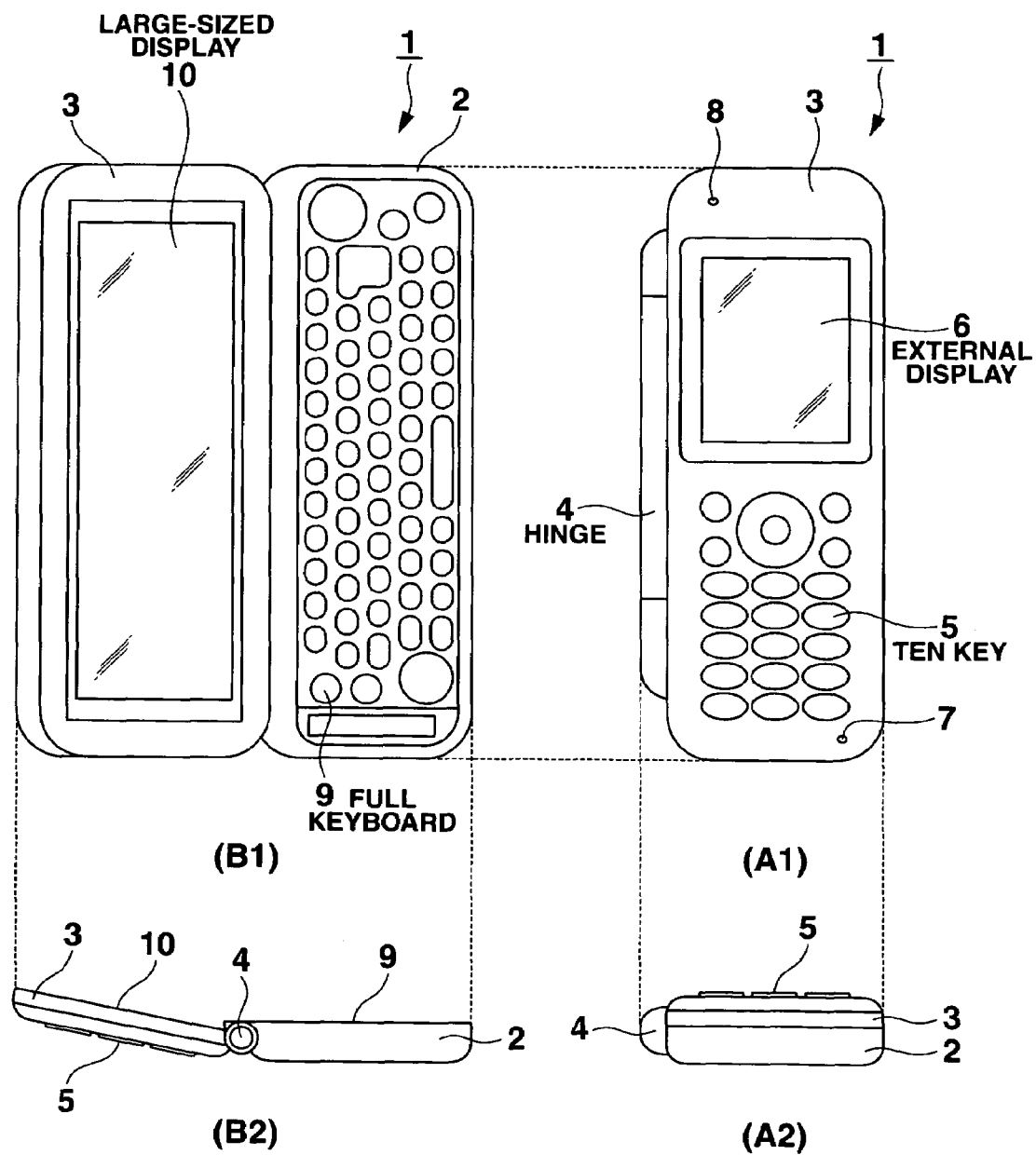
FIG. 8 is an external view of the appearance of a prior art cellular phone with both a ten key and a full keyboard.

FIG. 6A is a perspective view illustrating a rotating operation of a display case 13' of the upper stage above a full-key case 12' of the middle stage, which is performed when the cellular phone according to the third embodiment of the present invention is changed into keyboard style. FIG. 6B is a perspective view of the appearance of the keyboard-style cellular phone according to the third embodiment of the present invention.

Like the cellular phone of the first embodiment, the cellular phone of the third embodiment has a three-stage stacked structure including a rectangular ten-key case 11' of the lower stage, a full-key case 12' of the middle stage, and a display case 13' of the upper stage. These cases 11', 12' and 13' have the same outside dimensions.

As indicated by arrow X1 of FIG. 5B, the ten-key case 11' includes a call/data input shared ten key 14'. The ten key 14' is exposed when the ten-key case 11' is slid from the cases 12' and 13' by a given distance in the downward direction indicated by arrow X1 in FIG. 5B.

The call/data input shared ten key 14' is changed into a call input mode 14'T to set the display of key characters when the call style of the cellular phone used longitudinally as shown in FIG. 5B is detected by a switch or the like. It is also changed into a data input mode 14'D to set the display of key characters when the keyboard style of the cellular phone used laterally as shown in FIG. 6B is detected by the switch or the like.

FIG. 7A is a pattern diagram of displaying key characters in call input mode 14'T in the call/data input shared ten key 14' of the cellular phone according to the third embodiment of the present invention.

FIG. 7B is a pattern diagram of displaying key characters in data input mode 14'D in the call/data input shared ten key 14' of the cellular phone according to the third embodiment of the present invention.

When the call style of the cellular phone used longitudinally as shown in FIG. 5B is detected by the switch or the like, the call/data input shared ten key 14' is changed into the call input mode 14'T shown in FIG. 7A to display key characters, with the result that it appears that the key characters are erected longitudinally. When the keyboard style of the cellular phone used laterally as shown in FIG. 6B is detected by the switch or the like, the call/data input shared ten key 14' is changed into the data input mode 14'D shown in FIG. 7B to display key characters, with the result that it appears that the key characters are erected laterally.

In the cellular phone of the third embodiment, the first and second keys 18 and 19 and cursor key 20 are arranged on the upper end portion of the front of the display case 13' on which the liquid crystal display 16 is provided.

In the cellular phone of the third embodiment, too, an image can be displayed on the display 16 using the first and second keys 18 and 19 and cursor key 20 in the compact style shown in FIG. 5A, (A1) and (A2), as in the first embodiment. When a user receives an incoming call, he or she can depress any of keys 18 to 20 to perform a calling operation and thus can call using the microphone 15 on the ten-key case 11' that is hidden in the lower end middle portion and the speaker 17 that is located at the upper end portion of the display case 13'.

In the call style shown in FIG. 5B, the ten-key case 11' is slid downward to expose the call/data input ten key 14' and microphone 15. In this style, a user can dial using key characters in the call input mode 14'T shown in FIG. 7A and call using the microphone 15 and speaker 17.

In the cellular phone of the third embodiment, the display case 13' can be turned 180° clockwise two-dimensionally as indicated by arrow Y2 in FIG. 6A with regard to a rotating shaft O2 in the compact style indicated by (A1) and (A2) of FIG. 5A. The rotating shaft O2 is located in the right middle of the front of the display case 13'. In the keyboard style shown in FIG. 6B, the display case 13' is turned completely 180° and thus arranged alongside the full-key case 12'. In this style, the cellular phone is used laterally, and the full keyboard 21 is exposed to the entire surface of the full-key case 12'.

In the keyboard style shown in FIG. 6B, a user can easily create, send and receive e-mail and browse the Web page with both hands, using the keys 18 to 20 of the display case 13', full keyboard 21, call/data input ten key 14 ' in the key characters in the data input mode 14'D, which are exposed by sliding the ten-key case 11' to the right, and liquid crystal display 16.

The first and second keys 18 and 19 and cursor key 20 are located in the right side of the display case 13'. Moreover, a ten-key input operation can be performed independently by the call/data input ten key 14' on the right side of the full keyboard 21, as in a desktop personal computer. A user can thus input data and depress a button quickly on the e-mail and the Web page with good operability.

According to the third embodiment, a key character pattern for providing the cellular phone longitudinally in the call input mode 14'T and a key character pattern for doing it laterally in the data input mode 14'D are switched to each other by varying the display mode of the keyboard to be displayed when the shared ten key 14' itself is formed as a touch key. If the shared ten key 14' is a push-fit key, the tops of the keys are provided with characters for providing the cellular phone longitudinally and characters for doing it laterally and the keys include internal light sources corresponding to the characters to light the keys corresponding to each mode. The switching of key characters and the switching of light sources is performed by detecting the turn of the display case 13' by means of a detection switch (not shown) and the control of the internal computer that controls the operation of the cellular phone.

The cellular phone according to each of the first to third embodiments has a stacked structure including a ten-key case of the lower stage, a full-key case of the middle stage and a display case of the upper stage. However, the ten-key case can be formed in the middle stage, and the full-key case can be formed in the lower stage. The display case of the upper stage and the ten-key case of the middle stage can be turned with regard to the full-key case of the lower stage. The ten-key case of the middle stage can be slid from the display case alone or together with the full-key case of the lower stage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cellular phone having a three-stage stacked structure including a display case of an upper stage with a display screen, a keyboard case of a middle stage with a keyboard, and a key case of a lower stage with a dial key on one end portion of a surface thereof and a ten key on another end portion thereof,
   wherein:
   the display case is configured to turn on a shaft two-dimensionally to expose the keyboard of the keyboard case, the shaft being located in a middle of the keyboard case and close to a long side thereof; and
   the key case is configured to slide with respect to the keyboard case toward both ends of the keyboard case, the key case sliding toward a first one of the ends to expose the dial key of the key case and sliding toward a second one of the ends to expose the ten key of the key case.

2. The cellular phone according to claim 1, wherein the display case includes an on-hook key, an off-hook key, and a speaker.

3. The cellular phone according to claim 2, wherein characters of the ten key of the key case and characters of the keyboard of the keyboard case are arranged in a same direction.

4. A cellular phone having a three-stage stacked structure including a display case of an upper stage with a display screen, a keyboard case of a middle stage with a keyboard, and a key case of a lower stage with a shared key for a dial key and a ten key,
   wherein:
   the display case is configured to turn on a shaft two-dimensionally to expose the keyboard of the keyboard case, the shaft being located in a middle of the keyboard case and close to a long side thereof;
   the key case is configured to slide with respect to the keyboard case toward one end of the keyboard case to expose the shared key of the key case; and
   the cellular phone includes switching means for switching the shared key between the dial key and the ten key such that the shared key serves as the ten key if the keyboard of the keyboard case of the middle stage is exposed, and as the dial key if the keyboard is not exposed when the key case slides.

5. The cellular phone according to claim 4, wherein the display case includes an on-hook key, an off-hook key, and a speaker.

6. The cellular phone according to claim 5, wherein the shared key is a touch key of a display type, and the switching means switches a display mode between the dial key and the ten key.

7. The cellular phone according to claim 5, wherein the shared key has characters of a dial key and a ten key whose directions are different, and the dial key and the ten key are switched to each other by controlling lighting of an internal light source.

\* \* \* \* \*